United States Patent Office 3,703,538
Patented Nov. 21, 1972

3,703,538
PRODUCTION OF ANHYDROUS β-HYDROXY-
ALKYL CARBAMATES
John D. Malkemus, Austin, Tex., and John B. Bell,
Wyckoff, N.J., assignors to Jefferson Chemical Company, Inc., Houston, Tex.
No Drawing. Continuation of application Ser. No.
516,144, Dec. 23, 1965. This application Feb. 3,
1969, Ser. No. 796,206
Int. Cl. C07d 125/04
U.S. Cl. 260—482 C                    7 Claims

ABSTRACT OF THE DISCLOSURE

Anhydrous β-hydroxyalkyl carbamates are produced by reaction under substantially anhydrous conditions of a cyclic alkylene carbonate with ammonia in the presence of a β-hydroxyalkyl carbamate solvent which causes the reaction to be initiated at about atmospheric pressures.

CROSS-REFERENCE TO COPENDING APPLICATION

This application is a continuation of our application Ser. No. 516,144 filed Dec. 23, 1965, now abandoned.

DESCRIPTION OF THE INVENTION

This invention relates to the preparation of anhydrous β-hydroxyalkyl carbamates. More particularly, this invention relates to the preparation of anhydrous β-hydroxyalkyl carbamates by the reaction of a cyclic alkylene carbonate with ammonia in the presence of a β-hydroxyalkyl carbamate used as a solvent.

The preparation of hydroxyalkyl carbamates is disclosed in Malkemus U.S. Pat. 2,627,524. In accordance with the preferred method disclosed in that patent, a cyclic alkylene carbonate is allowed to react wtih ammonia in an aqueous system. Under these conditions, the exothermic reaction of the ammonia with the carbonate proceeds readily and, in general, it is necessary to cool the reaction mixture to prevent excessive temperatures. However, as one would expect, the hydroxyalkyl carbamate produced is susceptible to hydrolysis and substantial hydrolysis does occur during the recovery of the product, decreasing the yield. Further, if water remains in the product hydrolysis occurs on storage, decreasing the purity of the product.

In U.S. Pat. 2,627,524 it was pointed out that anhyrous ammonia can also be used for this reaction. However, the solubility of ammonia in the alkylene carbonate at temperatures required for the reaction is negligible at atmospheric pressure so that super atmospheric pressures of about 200 p.s.i.g. must be employed to cause the reaction to be initiated when using anhydrous ammonia. The use of a high pressure process is generally undesirable because of the additional equipment requirements and greater hazards involved.

We have now discovered that substantially anhydrous hydroxyalkyl carbamates can be prepared without resorting to such super atmospheric pressures in the reaction of an alkylene carbonate with ammonia by employing as solvent the product hydroxyalkyl carbamate. Thus, for example, anhydrous hydroxyethyl carbamate can be readily prepared by the reaction at about atmospheric pressures of ethylene carbonate with anhydrous ammonia in the presence of a hydroxyethyl carbamate as solvent which acts as an initiator for the reaction. By our process any hydroxyalkyl carbamate that can be prepared in accordance with the process described in U.S. Pat. 2,627,524 can now be readily obtained in an anhydrous condition at convenient operating pressures.

The pressure at which the reaction occurs may vary from strictly atmospheric pressure, but it may be said that it occurs at about atmospheric pressure, or at pressures below the pressure which is necessary to initiate the reaction in the absence of the hydroxyalkyl carbamate solvent. As a preferred embodiment, the reaction is initiated at atmospheric pressure with a maximum pressure of about 30 p.s.i.g. being developed during the reaction.

The invention will be further illustrated by the following specific examples.

EXAMPLE I

Anhydrous ammonia gas was passed slowly at atmospheric pressure into a homogenous mixture of 105 grams of 2-hydroxyethyl carbamate and 88 grams of ethylene carbonate. The temperature rose during the first 10 minutes from 33 C. to 43° C. The temperature of the mixture was controlled at 20° C. by means of external cooling as anhydrous ammonia was continually added. After two hours, the weight gain was 38 grams; and, after five hours, was still 38 grams The mixture was allowed to stand overnight and excess ammonia was removed at 50° C. under water pump vacuum. The crude product weighed 211 grams (theory 210 grams). Vacuum distillation of this crude product gave 5 grams of forerun and 200.5 grams of material boiling at 132°–140° C. at 0.7 mm. pressure, identified as 2-hydroxyethyl carbamate. The yield of distilled product was 91%, assuming that 105 grams of the product was the original hydroxyethyl carbamate used as solvent.

EXAMPLE II

To 105 grams (1 mol) of 2-hydroxyethyl carbamate saturated with ammonia gas at 40°–50° C. was added in small portions 2,200 grams (25 mols) of ethylene carbonate while ammonia gas was passed continuously into the mixture at atmospheric pressure over a period of 10 hours. A total of 484 grams (28.5 mols) of ammonia was charged. The crude water-white product was stripped at 70°–90° C. over a period of 8 hours to a final pressure of 2–3 mm. A virtually quantitative yield of water-white viscous liquid remained. This 2-hydroxyethyl carbamate had an index of refraction of 1.4662, a freezing point of 30.6° C. and a density of 1.290.

EXAMPLE III

A mixture of 5 lbs. of 2-hydroxyethyl carbamate and 16.76 lbs. of ethylene carbonate in a five-gallon stainless steel kettle was heated to 45° C. Anhydrous liquid ammonia was passed into the liquid mixture at atmospheric pressure, resulting in an exothermic reaction which necessitated cooling the contents of the kettle by means of circulating cold water. After one hour, 4.77 lbs. of ammonia had been added with a maximum pressure of 30 p.s.i.g. The reaction mixture was digested for one hour longer at 50° C. and excess ammonia was removed by stripping at 50° C. at 15 to 20 mm. pressure. The filtered product weighed 25.4 lbs. (theory, 25 lbs.). This product 2-hydroxyethyl carbamate was found to contain less than 0.1% unreacted ethylene carbonate, 13.15% nitrogen by Kjeldahl analysis (theory, 13.33%), 0.9% ethylene glycol and 0.08% water by Karl Fischer analysis.

EXAMPLE IV

In accordance with the procedure of Example III, 5.04 lbs. of 2-hydroxypropyl carbamate and 17.19 lbs. of propylene carbonate were treated with 3.86 lbs. of anhydrous ammonia over a period of one hour at 50° C. After digesting for two hours at this same temperature 24.5 lbs. of filtered product was obtained. Analysis showed the 2-hydroxypropyl carbamate product to contain 0.3% of cyclic carbonate, 11.52% nitrogen (theory, 11.75%), 0.07% ammonia, 0.5% glycol and 0.07% water.

EXAMPLE V

Following the procedure of Example III in a five-gallon kettle were placed 6 lbs. of a 60–40 mixture by weight of 2-hydroxyethyl carbamate and 2-hydroxypropyl carbamate, 9.97 lbs. of ethylene carbonate and 6.77 lbs. of propylene carbonate. This mixture was heated to a temperature of 50° C. and 3.8 lbs. (25% molar excess) of anhydrous ammonia was introduced at atmospheric pressure and passed into the mixture over a one-hour period. The mixture was then digested at 50° to 75° C. for two hours. Excess ammonia was removed by stripping and the product was filtered. The product weighed 25.18 lbs. as compared to a theoretical yield of 25.80 lbs. Analysis indicated the mixed carbamate product to contain 0.55% cyclic carbonate, 12.45% nitrogen, 0.62% glycol and 0.08% water. The product had a density of 1.249 and a freezing point of 5.8° C.

EXAMPLE VI

This example demonstrates the necessity of using the reaction product as a solvent in order to initiate the reaction at atmospheric pressures. Anhydrous ammonia was passed through a gas diffusion tube into 204 grams of propylene carbonate at 30° C. for one hour at atmospheric pressure. There was no evidence of an exothermic reaction and there was no appreciable weight increase. The propylene carbonate was then cooled to −60° C. and ammonia was again passed into the propylene carbonate and condensed at this temperature. A total of 40 grams of ammonia was thus added. The mixture was allowed to warm slowly. Ammonia was continuously evolved. When the temperature reached 20° C., all ammonia had been evolved with no reaction taking place as evidenced by no weight increase.

Our process will find its greatest applicability in the preparation of anhydrous hydroxyethyl carbamate, hydroxypropyl carbamate or mixture thereof because of the current commercial interest in these products. Its applicability is by no means limited to the preparation of these products since it may be used to prepare an anhydrous β-hydroxyalkyl carbamate by the reaction of any cyclic alkylene carbonate with ammonia.

It is obvious that mixtures of anhydrous hydroxyalkyl carbamates may be obtained by our process in a number of ways. For example, one may start with a mixture of alkylene carbonates dissolved in a single hydroxyalkyl carbamate or a mixture of hydroxylalkyl carbamates. Mixtures of products may also be obtained by starting with a solution of an alkylene carbonate in a hydroxyalkyl carbamate derived from a different alkylene carbonate.

In any case the reaction will be initiated at substantially atmospheric pressure when the hydroxyalkyl carbamate is used as the solvent. Previously, it was not possible to cause the cyclic alkylene carbonate to react with anhydrous ammonia without resorting to super atmospheric pressures of about 200 p.s.i.g., for example. It is the object of this invention to provide an improved process where the reaction will occur at pressures considerably less than previously thought necessary. As hereinbefore taught and illustrated, we have accomplished this objective.

We claim:

1. In a method for the production of anhydrous β-hydroxyalkyl carbamates by the reaction of anhydrous ammonia with a cyclic alkylene carbonate in the presence of a solvent, the improvement which comprises initiating the reaction under substantially anhydrous conditions, wherein the solvent is a β-hydroxyalkyl carbamate, which is the same as or a homologue of the carbamate end product of the reaction, at a pressure less than that which is necessary to initiate the reaction in absence of the β-hydroxyalkyl carbamate solvent.

2. A method as in claim 1 wherein the reaction is initiated at about atmospheric pressure.

3. A method as in claim 1 wherein the cyclic alkylene carbonate is ethylene carbonate and the solvent is 2-hydroxyethyl carbamate.

4. A method as in claim 1 wherein the alkylene carbonate is propylene carbonate and the solvent is 2-hydroxypropyl carbamate.

5. A method as in claim 1 wherein the alkylene carbonate is a mixture of ethylene carbonate and propylene carbonate and the solvent is a mixture of 2-hydroxyethyl carbamate and 2-hydroxypropyl carbamate.

6. A method as in claim 1 wherein the alkylene carbonate is ethylene carbonate and the solvent is 2-hydroxypropyl carbamate.

7. A method as in claim 1 wherein the alkylene carbonate is propylene carbonate and the solvent is 2-hydroxyethyl carbamate.

References Cited

UNITED STATES PATENTS

| 2,424,589 | 7/1947 | Steadman | 260—344 |
| 2,627,524 | 2/1953 | Malkemus | 260—482 |

FOREIGN PATENTS

| 589,331 | 12/1959 | Canada | 260—482 |
| 689,705 | 9/1950 | Great Britain | 260—482 |
| 1,096,204 | 1/1955 | France | 260—482 |

LORRAINE A. WEINBERGER, Primary Examiner

P. J. KILLOS, Assistant Examiner